United States Patent [19]

Oswald et al.

[11] Patent Number: 5,181,039
[45] Date of Patent: Jan. 19, 1993

[54] SYSTEM FOR SENSING THE APPROACH OF A MOVING MISSILE TO A TARGET

[75] Inventors: Gordon K. A. Oswald, Huntingdon; Christopher S. Neal, Cambridgeshire; Alan T. Richardson, Cambridge, all of United Kingdom

[73] Assignee: Cambridge Consultants Limited, Cambridge, United Kingdom

[21] Appl. No.: 768,402
[22] PCT Filed: Apr. 20, 1990
[86] PCT No.: PCT/GB90/00602
  § 371 Date: Sep. 16, 1991
  § 102(e) Date: Sep. 16, 1991
[87] PCT Pub. No.: WO90/13048
  PCT Pub. Date: Nov. 1, 1990

[30] Foreign Application Priority Data
  Apr. 22, 1989 [GB] United Kingdom ............... 8909195

[51] Int. Cl.⁵ ............................................. G01S 13/18
[52] U.S. Cl. ...................................... 342/119; 342/136
[58] Field of Search ................................ 342/119, 136

[56] References Cited
U.S. PATENT DOCUMENTS
  4,005,420  1/1977  McDonald .................... 342/119
  4,057,708  11/1977 Greeley et al. ................ 342/119

Primary Examiner—T. H. Tubbesing
Attorney, Agent, or Firm—Lee, Mann, Smith, McWilliams, Sweeney & Ohlson

[57] ABSTRACT

A system for determining the trajectory of a missile and the minimum miss distance with respect to a target aircraft, comprises two transmitters on the aircraft each cooperating with four receivers on the aircraft. Each transmitter radiates a succession of pulses each having a very short duration of the order of 2 nanoseconds and each having a shape approximating to a single sine wave. The transmitted pulses are reflected from the missile and received by the receivers each of which is accurately time gated so that the received signal is sampled at a predetermined time delay after the radiation of each transmit pulse. A time delay corresponds to a particular missile range, and by gating at different delays the sampled signals indicate when the missile enters or leaves a plurality of range envelopes surrounding the target. Processing of the sampled signals enables the missile trajectory and minimum miss distance to be computed.

9 Claims, 15 Drawing Sheets

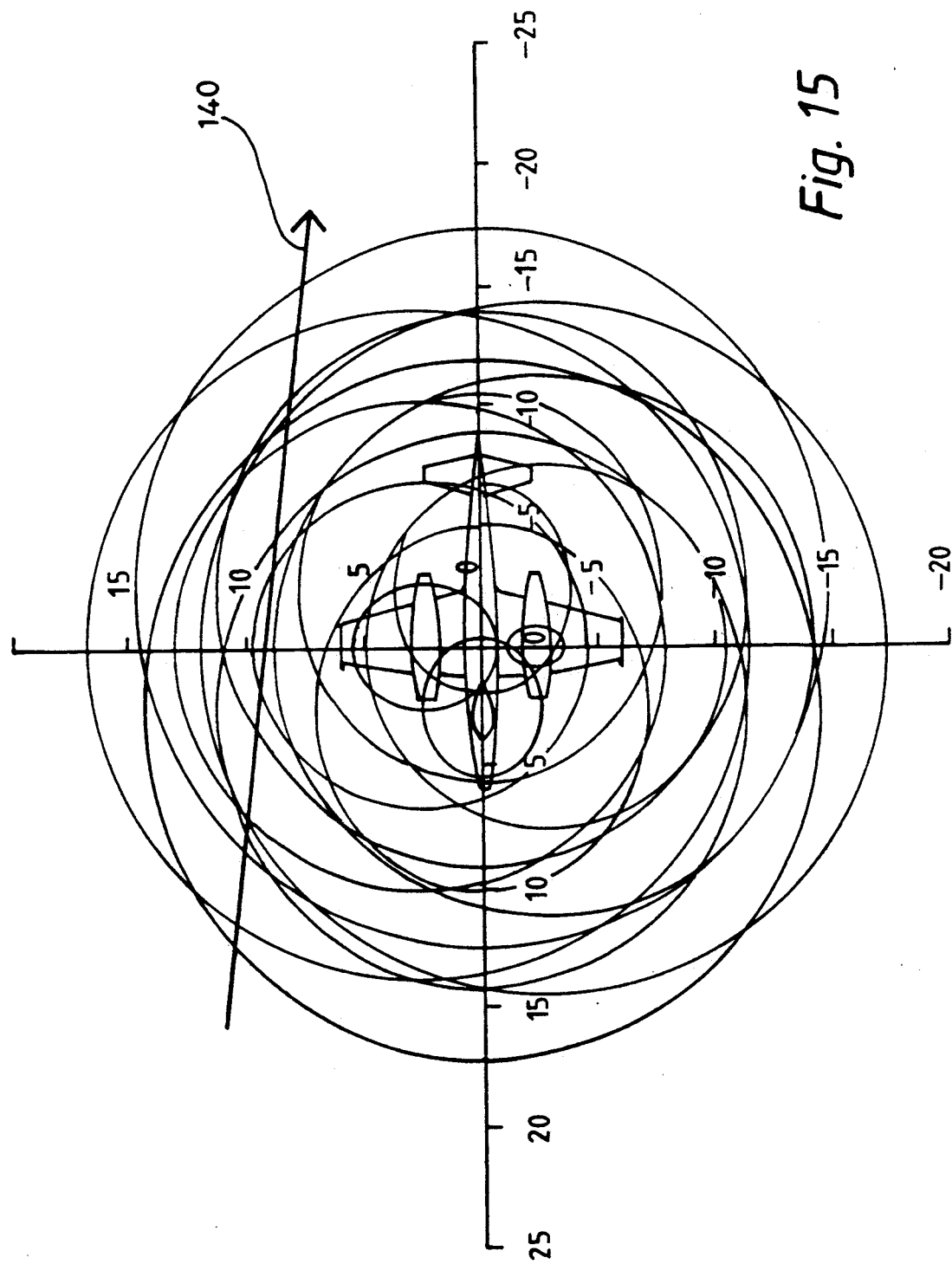

SYSTEM FOR SENSING THE APPROACH OF A MOVING MISSILE TO A TARGET

FIELD OF THE INVENTION

This invention relates to a system for sensing the approach of a moving missile to a target, and more particularly (but not exclusively) to a system for determining the trajectory and miss distance of a missile approaching a target, for testing of the system. Such systems are generally called "scoring systems". The missile can be any high speed projectile, such as an air-to-air missile, a ground-to-air missile, a sea-to-air missile, a shell or a large bullet. The target can be stationary, airborne or on water but is preferably an aircraft, tank or other moving vehicle.

BACKGROUND TO THE INVENTION

Several scoring systems have been developed previously, which rely on radio transmission. These can be divided into those which require equipment on both missile and target (called cooperative systems) and those which are accommodated entirely on the target (called non-cooperative systems) where the missile behaves as a passive reflector or scatterer. The invention is concerned with non-cooperative systems.

U.S. Pat. No. 4,057,708 discloses a known non-cooperative system which measures the minimum miss distance and three dimensional coordinates of a missile trajectory with respect to a target in the form of an aircraft. This system uses pulses having a duration of 40 nanoseconds. Each transmitted pulse is derived by gating a continuously running oscillating signal so the transmitted pulse consists of several oscillations. The pulses reflected by the missile are received by a receiver on the aircraft, but accurate detection of missile presence is not possible, firstly because of multipath effects due to reflection from the aircraft skin and secondly because of the difficulty of correctly identifying the received signal with the multiple scatterers on the missile, such as nose fins or tail wings. The nature of the transmitted pulse does not enable these different features to be resolved.

DISCLOSURE OF THE INVENTION

According to the invention there is provided a system for sensing the approach of a moving missile to a target, comprising transmitting means on the target for transmitting a succession of transmit pulses, receiving means on the target for receiving the pulses reflected by the missile, gating means on the target for sampling the reflected pulses received at the receiving means during a succession of time windows each of which is delayed with respect to the time of transmission of a corresponding transmit pulse by a predetermined time delay corresponding to the pulse travelling a predetermined distance from the transmitting means to the missile and thence back to the receiving means, so that sampled signals from the receiving means are indicative of the missile entering or leaving a notional envelope surrounding the target at a range corresponding to said predetermined time delay, and processing means which are responsive to the sampled signals and which compute the approach of the missile, wherein each transmitted pulse commences, from a level of no significant transmitted power in the frequency band width of the pulse, with a rapid rise to a power peak, such that the sampled signals are indicative of reflected pulses and not of reflections at the level of no significant power.

It will be appreciated that the envelope is an ellipsoid having the transmitting means and the receiving means as the foci.

Each transmit pulse preferably has a duration of less than 4 nanoseconds and each pulse may have, after the rapid rise to the power peak, a rapid fall, continuing to rise to a power peak of opposite polarity so that the complete pulse is substantially sinusoidal in shape.

In the simplest system according to the invention, the transmitting means comprise a single transmitter and the receiving means comprise a single receiver. This system provides a scalar result, that is it senses whether the missile has penetrated the notional envelope without giving any more information about the spatial position of the penetration. A system providing a vector result, i.e. giving a three dimensional indication of range requires at least three receivers located at different positions on the target. Such a system can compute missile trajectory and minimum miss distance. A practical vector system will normally have more than the minimum number of three receivers, in order to introduce some redundancy, and the preferred embodiment to be described includes two transmitters each cooperating with a corresponding group of four receivers.

The gating means preferably produce gating pulses to sample the reflected pulses at the receiving means. The gating pulses are very short duration (typically of the order of 700 picoseconds) and are accurately timed to be produced after a predetermined time delay corresponding to a predetermined range of the missile. Direct reflections from the missile will always arrive at the receiving means before multipath signals. This, together with the fact that the sampled signals will show no response prior to the response resulting from direct reflection of the initial peak of the very short duration transmit pulse, avoids multipath problems and enables reflections from different parts of the missile to be resolved.

A system according to the invention will now be described, by way of example, with reference to FIGS. 1 to 16 of the accompanying drawings, in which.

FIG. 1 diagrammatically illustrates the system applied to a target aircraft which has two transmitters and eight receivers, FIG. 2 shows the pulses transmitted by the two transmitters, FIG. 3 shows a standard radar pulse, for comparison with FIG. 2, FIG. 4 illustrates how multipath effects originate, FIG. 5 indicates how the inventive system overcomes multipath problems, FIG. 6 is a plot of relative power against frequency for each transmitted pulse, FIG. 7 is a block circuit diagram of the parts of the system on the aircraft, FIG. 8 is a block circuit diagram illustrating one of the two transmitters and one of the eight receivers, FIG. 9 is a timing diagram illustrating range gating of the reflected pulses at a representative receiver, FIG. 10 shows how output signals from the receivers are processed, FIG. 11 shows an idealized missile "signature", i.e. signal reflected from the missile, FIG. 12 shows the output from four range gates for each of two receivers, FIG. 13 shows the three range gate envelopes associated with three receivers cooperating with one transmitter, FIG. 14 illustrates the part of the system on the ground, FIG. 15 illustrates a missile track intersecting a family of range gate envelopes, FIGS. 16a to 16d are a block diagram of the system.

DESCRIPTION OF THE PREFERRED EMBODIMENT

Figure 1:
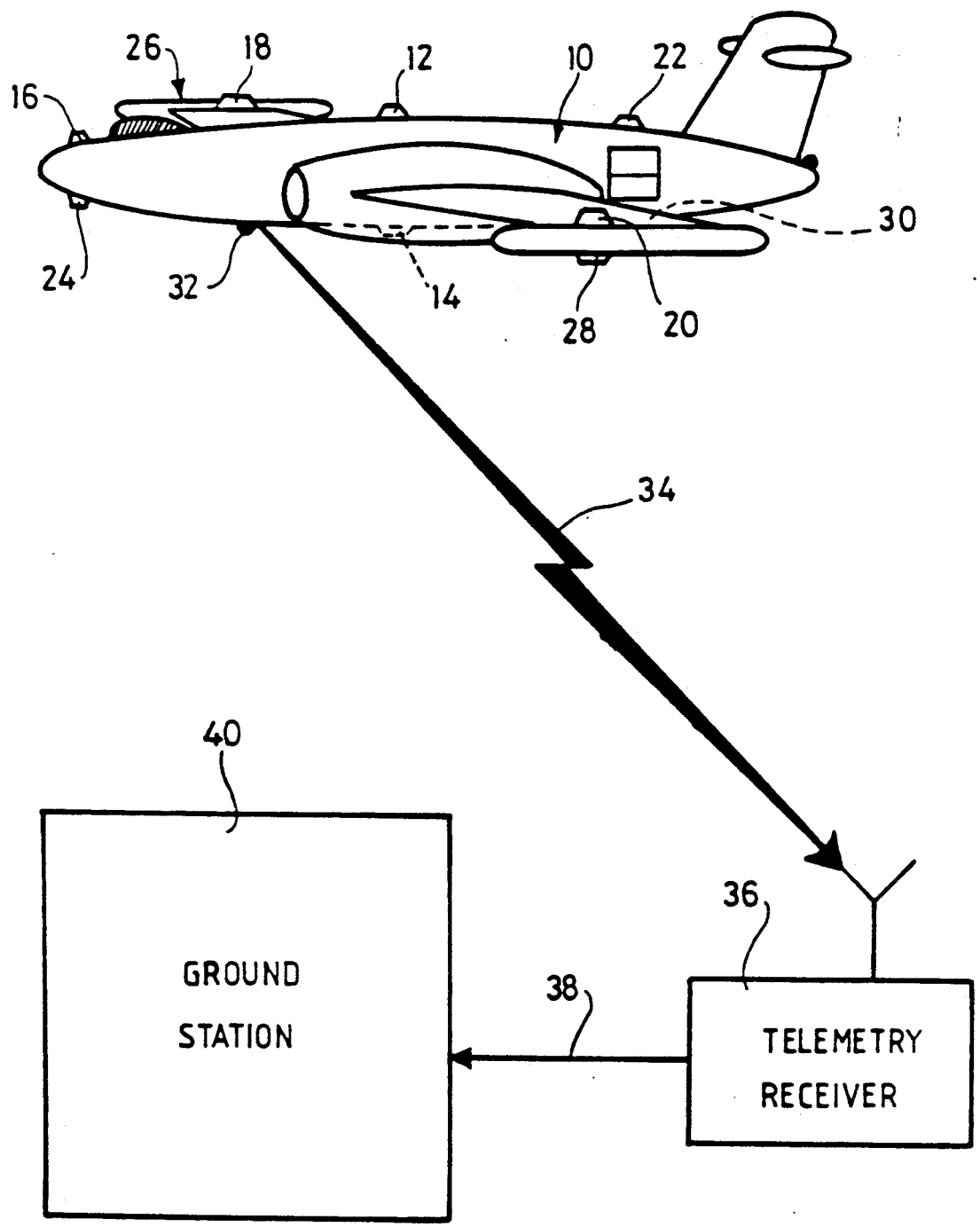

The system determines the trajectory and miss distance of a missile approaching a target aircraft 10 (FIG. 1), for testing of the system. The system is non-cooperative, the aircraft 10 carrying two transmitters 12, 14 and eight receivers 16, 18, 20, 22, 24, 26, 28, 30. The transmitter 12 is mounted on the top of the aircraft fuselage and cooperates with the four receivers 16, 18, 20 and 22 to monitor the hemisphere of space above the aircraft 10. The transmitter 14 is mounted on the underside of the aircraft fuselage and cooperates with the four receivers 24, 26, 28 and 30 to monitor the hemisphere of space below the aircraft 10. Each transmitter 12 or 14 transmits a succession of electromagnetic pulses which, on approach of the missile, are reflected by the missile, the reflected pulses being detected by the corresponding group of four receivers. The signals detected by the receivers are therefore representative of the trajectory of the missile, and this information is transmitted by a telemetry transmitter 32, as indicated at 34 in FIG. 1, to a ground-based telemetry receiver 36 linked by hard wiring 38 to a ground station 40.

Figure 2:
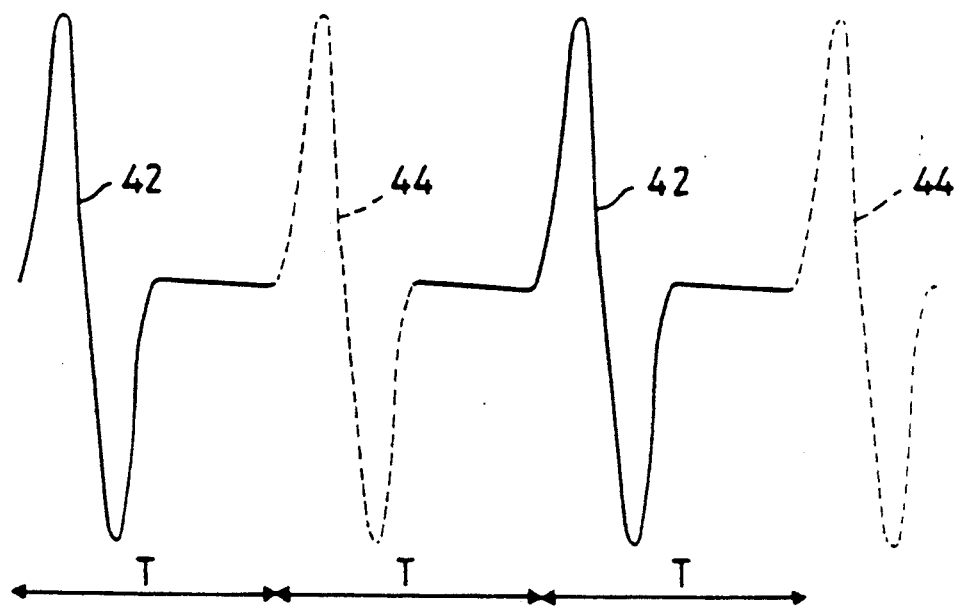

FIG. 2 shows at 42 the pulses transmitted by the transmitter 12 and at 44 the pulses transmitted by the transmitter 14. The pulses 42, 44 are identical but they are interleaved, i.e. they are transmitted in alternate sequence, (to avoid ambiguity about the originating transmitter). Each pulse 42 or 44 has a duration of 2 nanoseconds and there is a time T of 250 nanoseconds between successive pulses.

Figure 6:
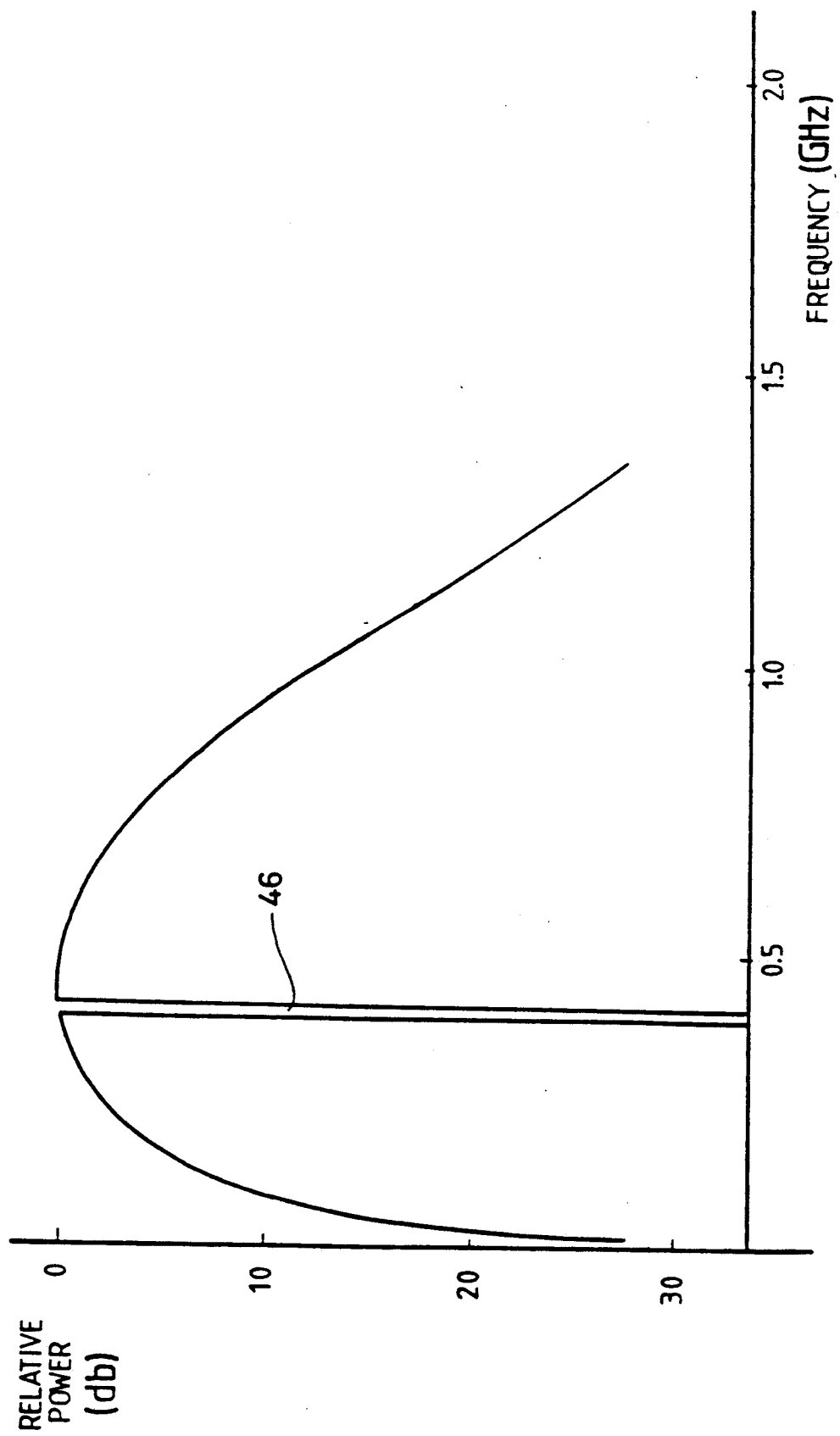

Each transmit pulse 42 or 44 is essentially a single cycle of sine wave and fundamentally has a power spectrum as in FIG. 6 but without the discontinuity shown at 46. Individual parts of the spectrum may be filtered to avoid interference with other systems such as the drone control filtering shown at 46 in FIG. 6. The pulse repetition frequency might be varied from 1 MHz to 10 MHz depending on the application.

The important properties of each transmitted pulse 42 or 44 are that the duration of the pulse is sufficiently short to resolve multiple scatterers (such as the nose and tail) on the missile and also sufficiently short to resolve multipath. The first peak of the waveform is very large compared to any energy (in the frequency band of the pulse) before this peak, which again distinguishes this system from a typical radar pulse (FIG. 3), so any received signal is unambiguously defined as emanating from this single cycle of energy.

Figure 3:
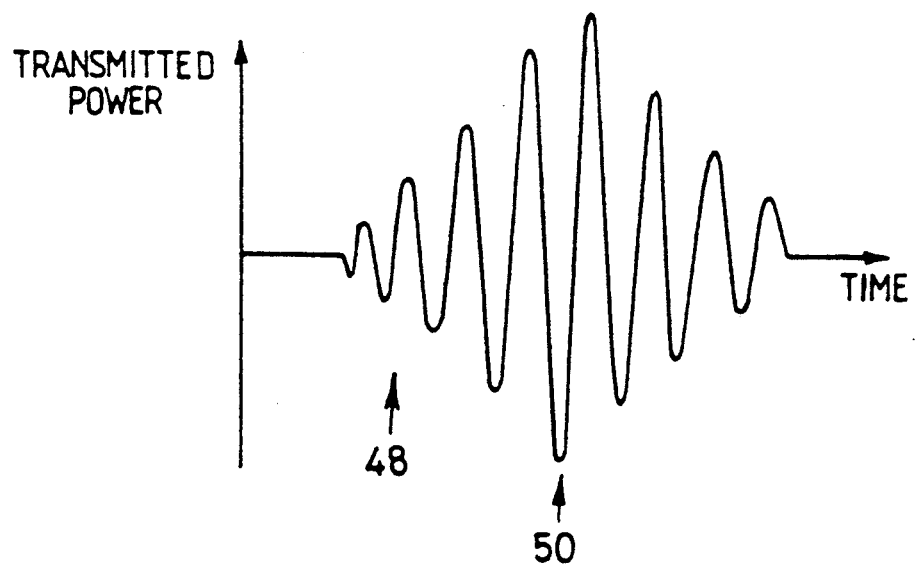

FIG. 3 shows a typical radar pulse for contrast with FIG. 2. The pulse has significant transmitted power in the region 48 before the main pulse peaks at 50. Because the transmitted pulse of FIG. 3 has a series of oscillations, the received pulse would be a jumble of peaks caused by multipath interference and unresolved reflections from different parts of the missile.

Figure 4:
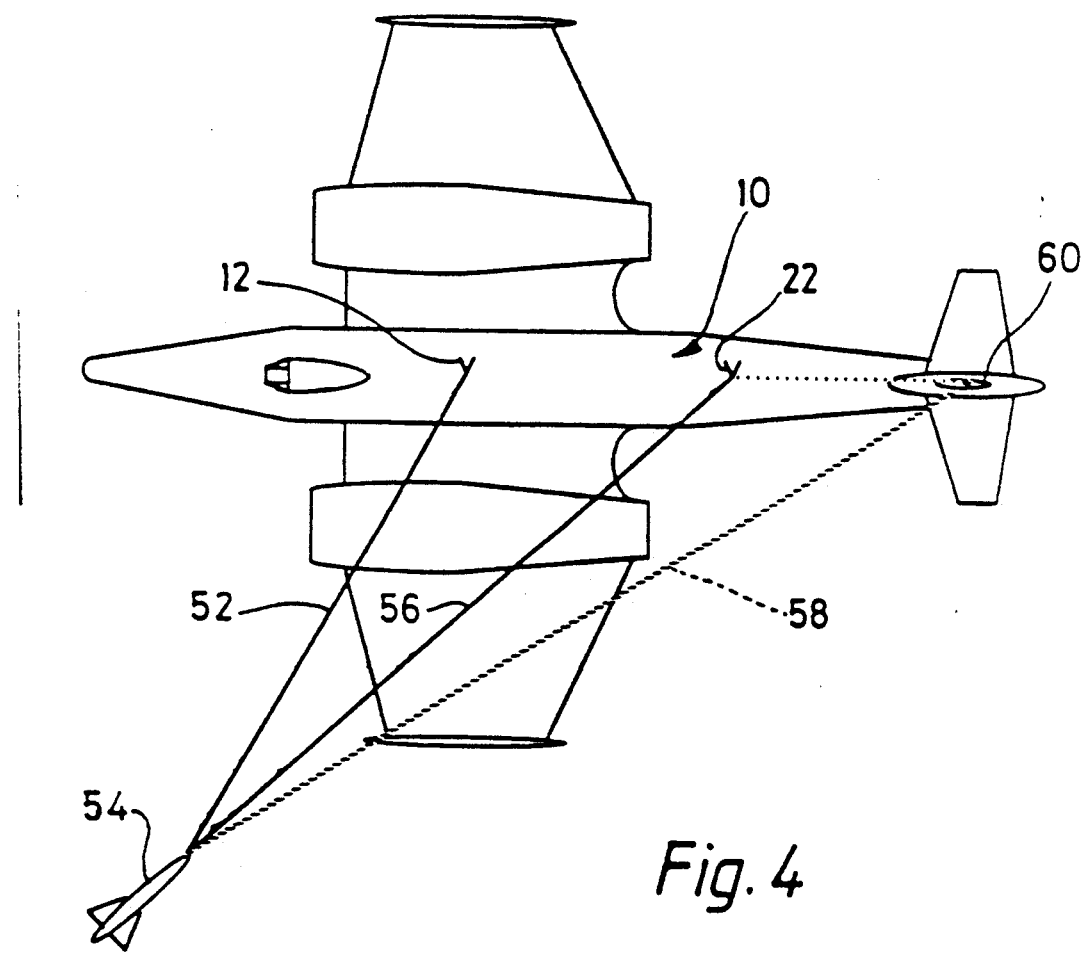
Figure 5:
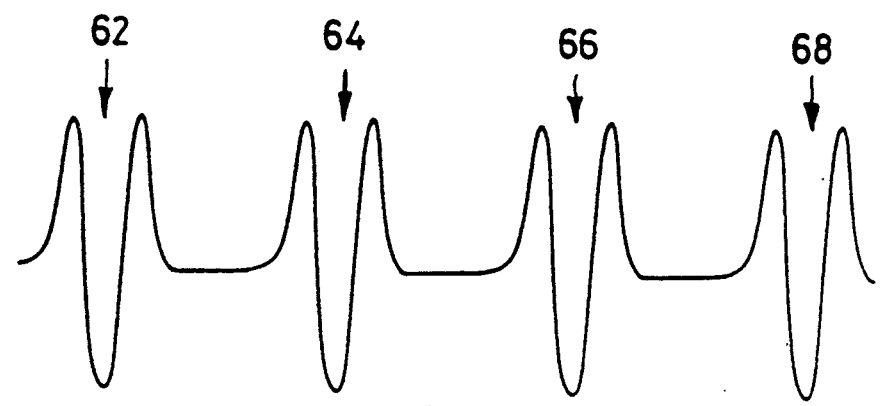

FIGS. 4 and 5 show how the invention overcomes the problem of multipath, in the simplified example of the aircraft 10 having one transmitter 12 and one receiver 22. Transmitted pulses 52, each having the form shown at 42 in FIG. 2, are reflected from the missile 54 to form a reflected signal 56 received by the receiver 22. The broken line 58 indicates an example of a multipath, the signal from the missile being reflected by the tailplane 60 of the aircraft 10 before reaching the receiver 22. The very short duration of each pulse 42 or 44, and the fact that the pulse is a near single cycle with a rapid rise to a power peak from a level of no significant power in the bandwidth of the pulse, enables signals from multiple reflections to be resolved, and also enables reflections from different features on the missile (e.g. nose and tail) to be resolved.

For example, FIG. 5 shows the idealized received signal in the inventive system as having significant amplitude at a first region 62 caused by reflection of a pulse from the missile nose, at a second region 64 caused by reflection of a pulse from the missile tail, and at further regions 66, 68 caused by multipath reflections from the missile nose and tail respectively.

Figure 7:
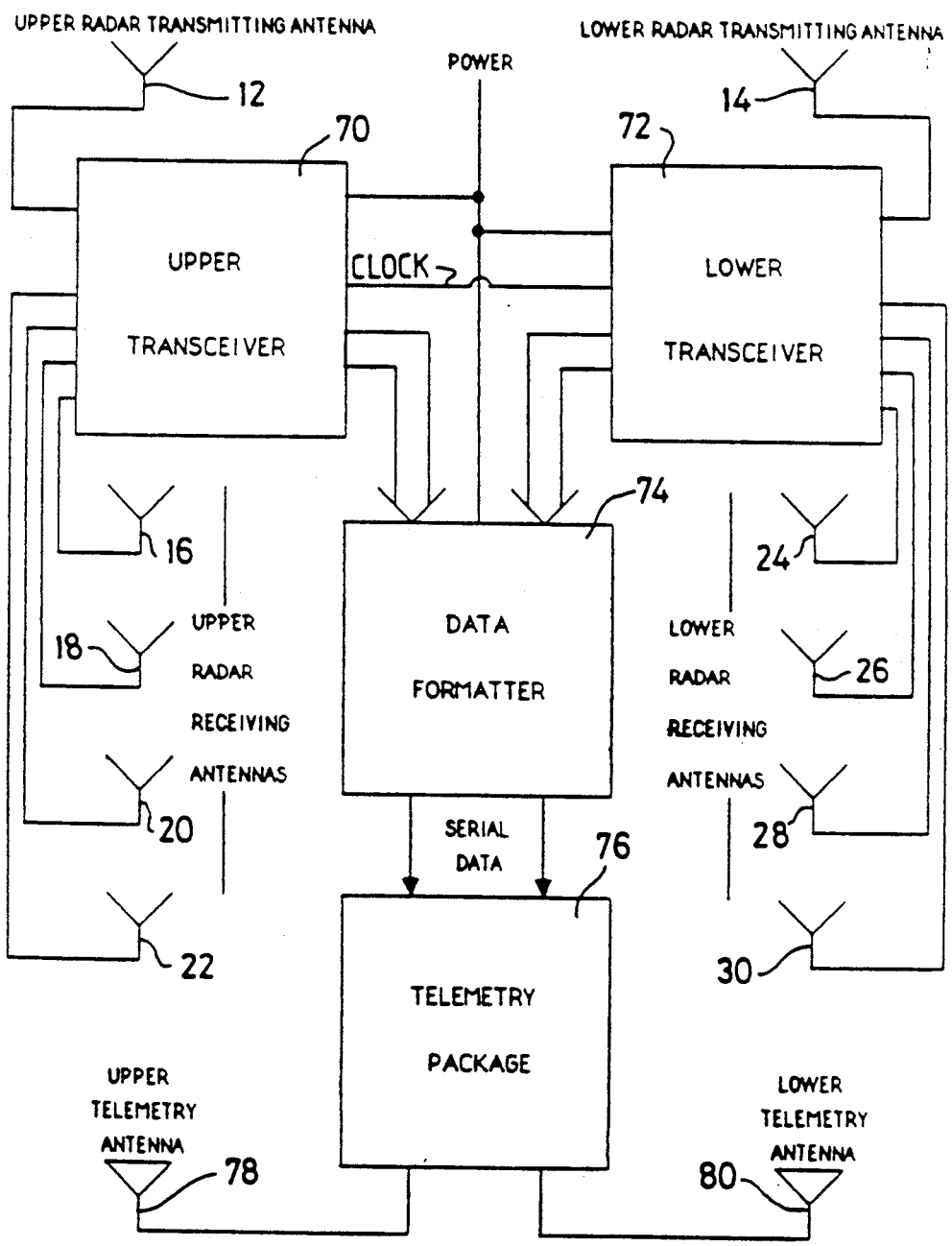

The airborne equipment of the system, i.e. the equipment on the aircraft 10, is illustrated diagrammatically in FIG. 7.

Associated with each of the two transmitters 12, 14 are the antennas of the four receivers 16, 18, 20, 22; 24, 26, 28, 30. An upper transceiver 70 generates the pulses transmitted by the upper transmitter 12 and processes the four waveforms received by the upper receivers 16, 18, 20, 22. A lower transceiver 72 performs a similar function for the lower transmitter 14 and lower receivers 24, 26, 28, 30.

Figure 8:
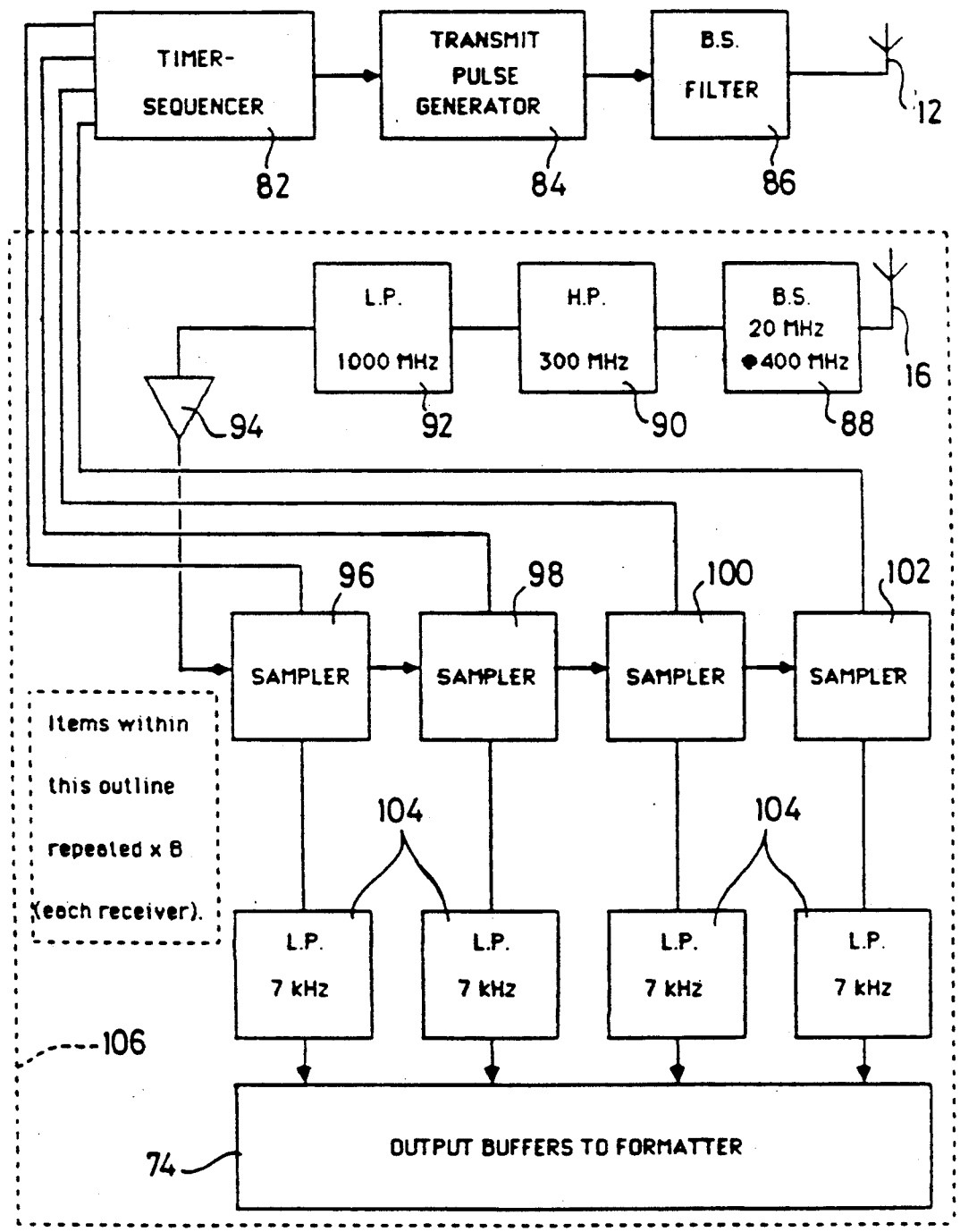

The upper transceiver 70 includes a master clock in the timer sequencer 82 (FIG. 8). The master clock produces a repetitive square wave the rising edge of which triggers the upper transmitter 12 to produce a pulse 42. The repetitive square wave is also passed to the timer sequencer of the lower transceiver 72 and the falling edge of the square wave triggers the lower transmitter 14 to produce a pulse 44.

The processed data from the two transceivers 70, 72 is passed to a data formatter 74 where it is digitized and assembled into a serial data stream which is passed to a telemetry package 76 for transmission to the ground by two telemetry antennas 78, 80 which are collectively equivalent to the transmitter 32 of FIG. 1.

FIG. 8 illustrates the composition of each transceiver 70 or 72.

The individual transceiver 70 or 72 is controlled by a timer-sequencer 82 which by means of a stable oscillator triggers a transmit pulse generator 84 repeatedly and regularly. The transmit pulse is filtered by a band stop filter 86 to prevent interference with aircraft systems. This filtered pulse is then transmitted by the antenna of the transmitter 12 (or 14). Each receiver (e.g. 16) receives a signal which is filtered to reject the drone control (in this case a 20 MHz wide filter 88 at 400 MHz) and then filtered to band limit signals to 300 MHz to 1000 MHz by high pass and low pass filters 90, 92. The signal is then amplified at 94 and sampled by gating means at precise delays after pulse transmission in respective range gates or samplers 96, 98, 100, 102. In this example there are four samplers per receiver at sampling instants defined by the timer sequencer. The sampled waveforms are then low-pass filtered in filters 104 and passed to the formatter 74.

Figure 9:
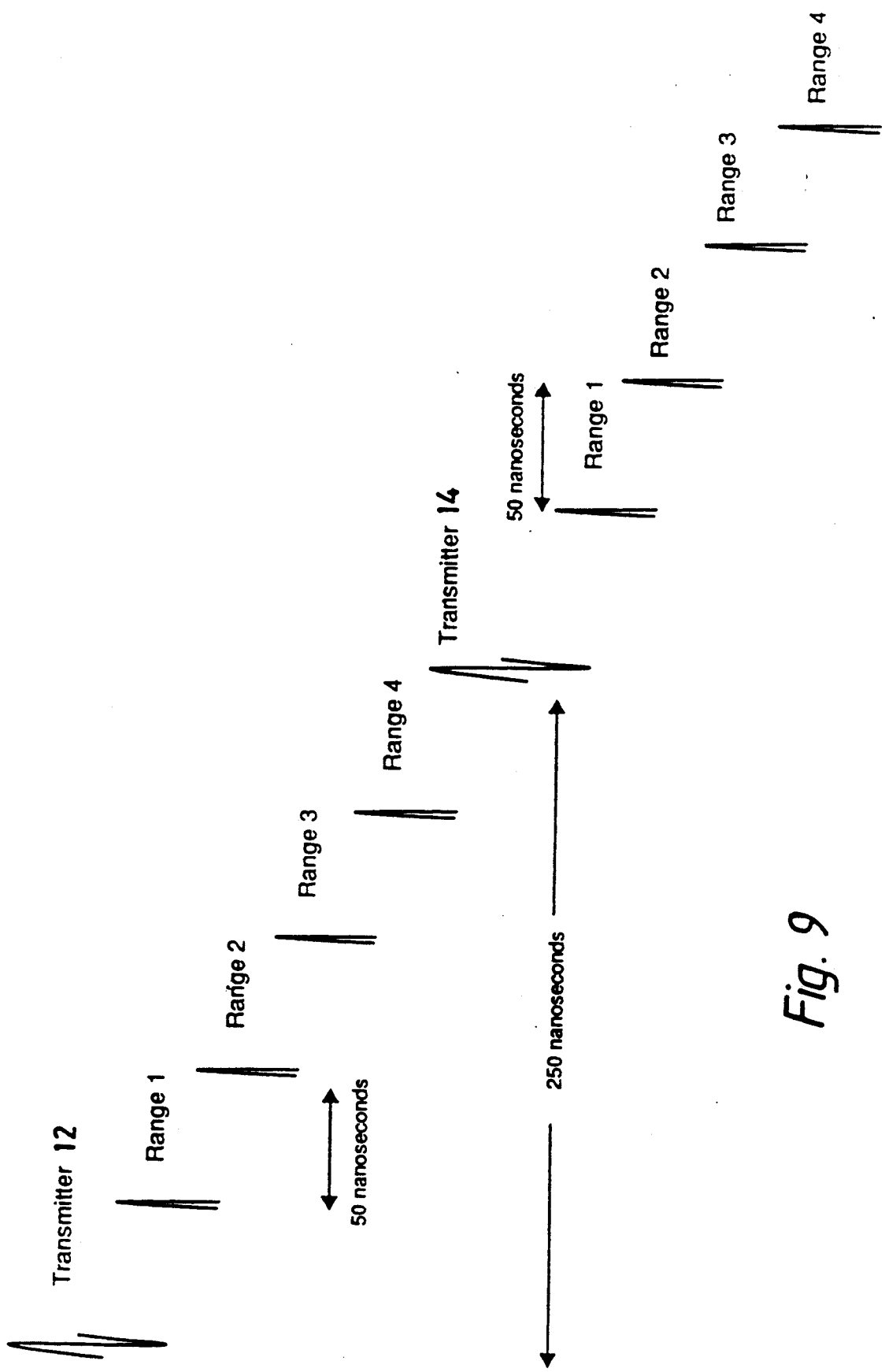

As indicated in FIG. 8, the components within the broken line boundary 106 are repeated eight times, once for each of the eight receivers The operation of the transceivers may be understood from FIG. 9 which shows the sequence of events for a single receiver for each of the two transmitters 12, 14. The delays of the four sampling pulses after transmission depend on the aircraft installation. In this example, the range gates are at 7.5 m, 15 m, 22.5 m and 30 m nominal range corresponding to a time interval of 50 nanoseconds between each successive sampling pulse. The interval between the two transmissions is determined by the requirement to receive the signal from transmitter 12 at range 4 before the transmission from transmitter 14. The sampling process shown is repeated for each of the four receivers associated with a given transmitter. Hence, for each transmitted pulse 42 from the transmitter 12, there are four signals from each of the four receivers 16, 18, 20, 22, and for each transmitted pulse 44 from the transmitter 14 there are four signals from each of the four receivers 24, 26, 28, 30, making a total of thirty two signals.

The sampler 96 produces a first sampling pulse (shown as Range 1 in FIG. 9) after a predetermined delay of 50 nanoseconds from transmission of a pulse 42 from the transmitter 12, corresponding to the pulse covering a total of 15 meters in its passage from the transmitter 12 to the missile and thence as a reflected pulse from the missile to the corresponding receiver. Hence the reception of a reflected pulse at the receiver during the time duration of this sampling pulse means that the missile has penetrated a notional envelope or shell having a shape of an ellipsoid with the transmitter and receiver as foci. The remaining sampling pulses (Range 2, Range 3, Range 4) are produced by the samplers 98, 100, 102 at longer time delays (100, 150, 200 nanoseconds) corresponding to notional envelopes or shells which are larger in size. In each case, the sampling pulse is accurately timed and is of short duration (700 picoseconds) so that the reception of a reflected pulse from the missile, during the very short time window of the sampling pulse, can be unambiguously resolved and reliably detected as the missile penetrating the predetermined envelope corresponding to the time delay (50, 100, 150 or 200 nanoseconds) of the sampling pulse after the transmitted pulse. A similar sequence of four gating pulses is produced after similar time delays from transmission of a pulse 44 by transmitter 14.

Figure 10:
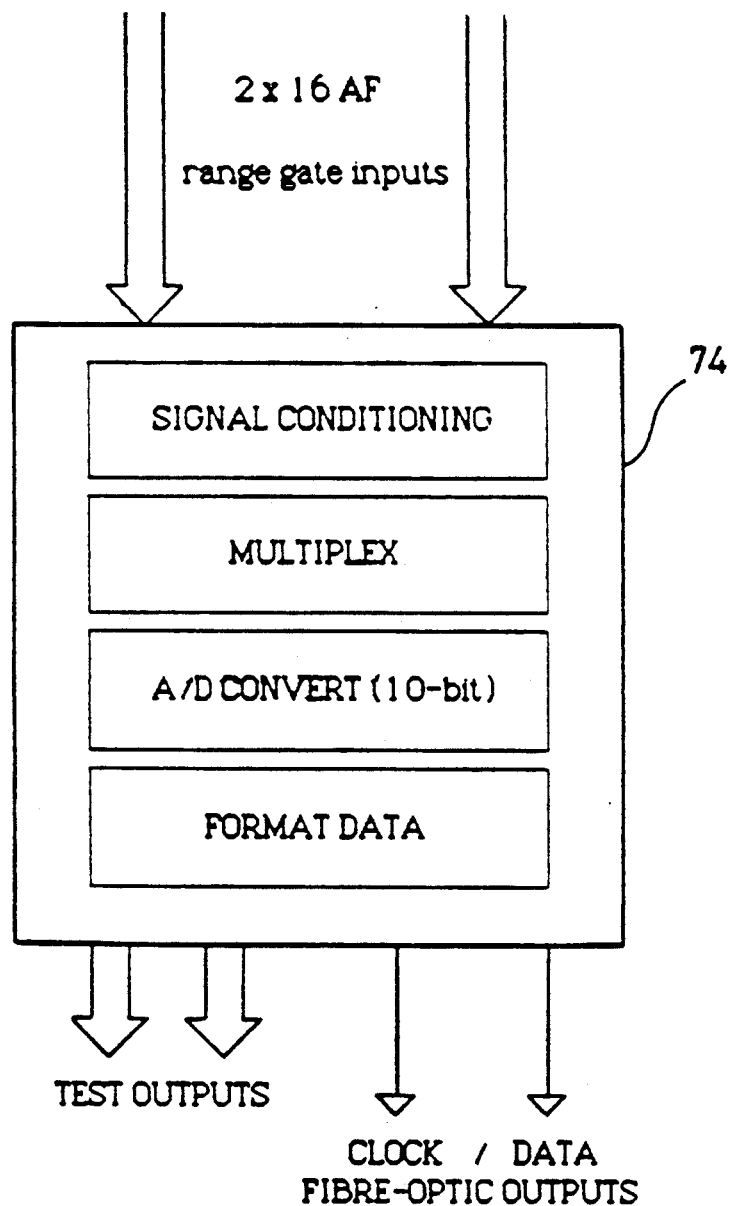

Referring to FIG. 10, the 2×16 audio frequency outputs from the two transceivers 70, 72 (derived from the thirty two signals previously mentioned) are passed to the formatter and filtered and amplified by the signal conditioner so that the signal lies between ±5 volts and the individual channels are passed to the analog-to-digital converter and converted to 10-bit digital words. These words are then formatted into a serial bit stream for supply to the telemetry package 76 of FIG. 7.

Figure 11:
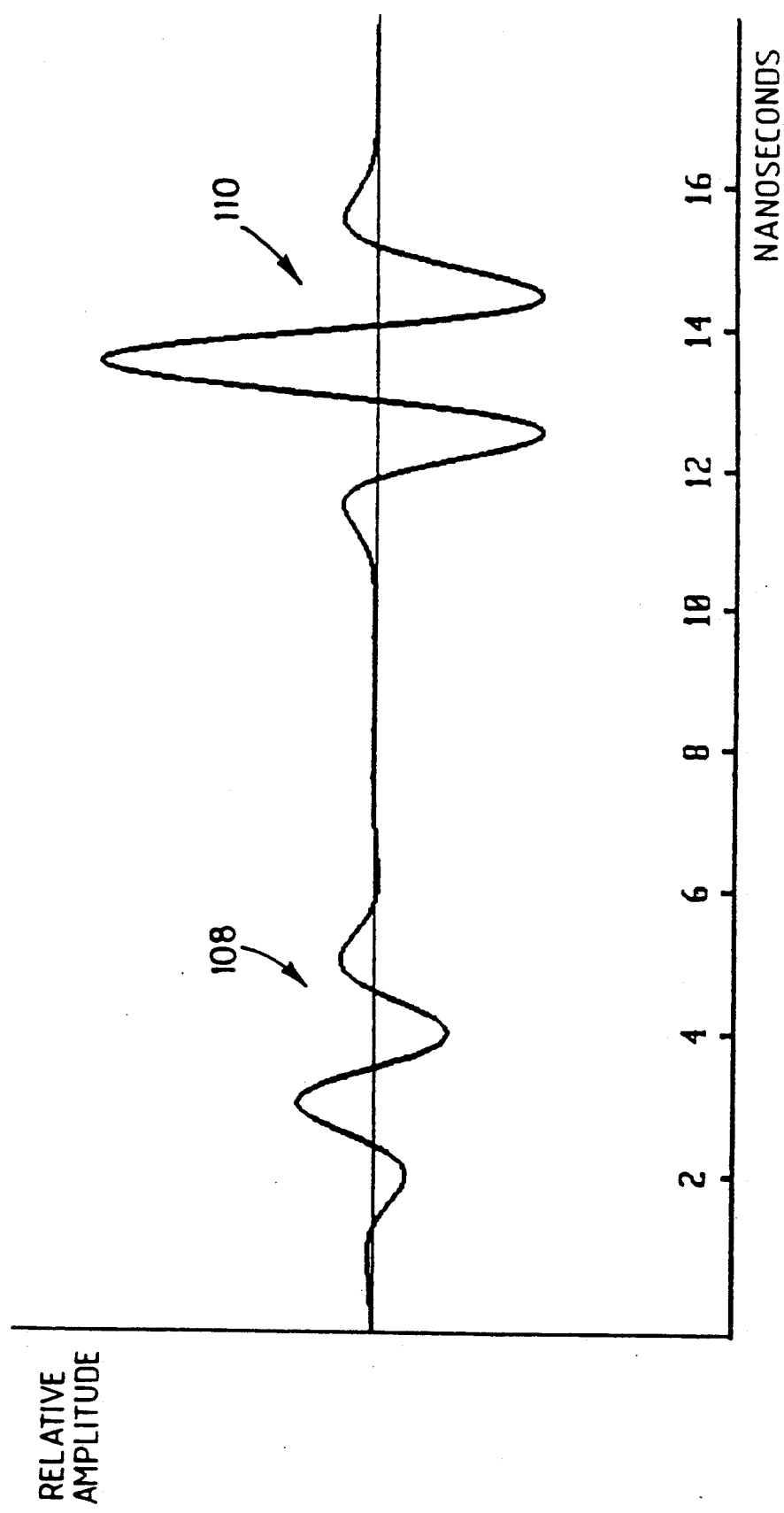

FIG. 11 shows an idealized missile signature with separate scattered waveforms 108, 110 from the nose and the tail respectively. The duration and separation of the waveform depends on the length of the missile and the illustrated case is for a missile approximately 2 meters long.

Figure 12:
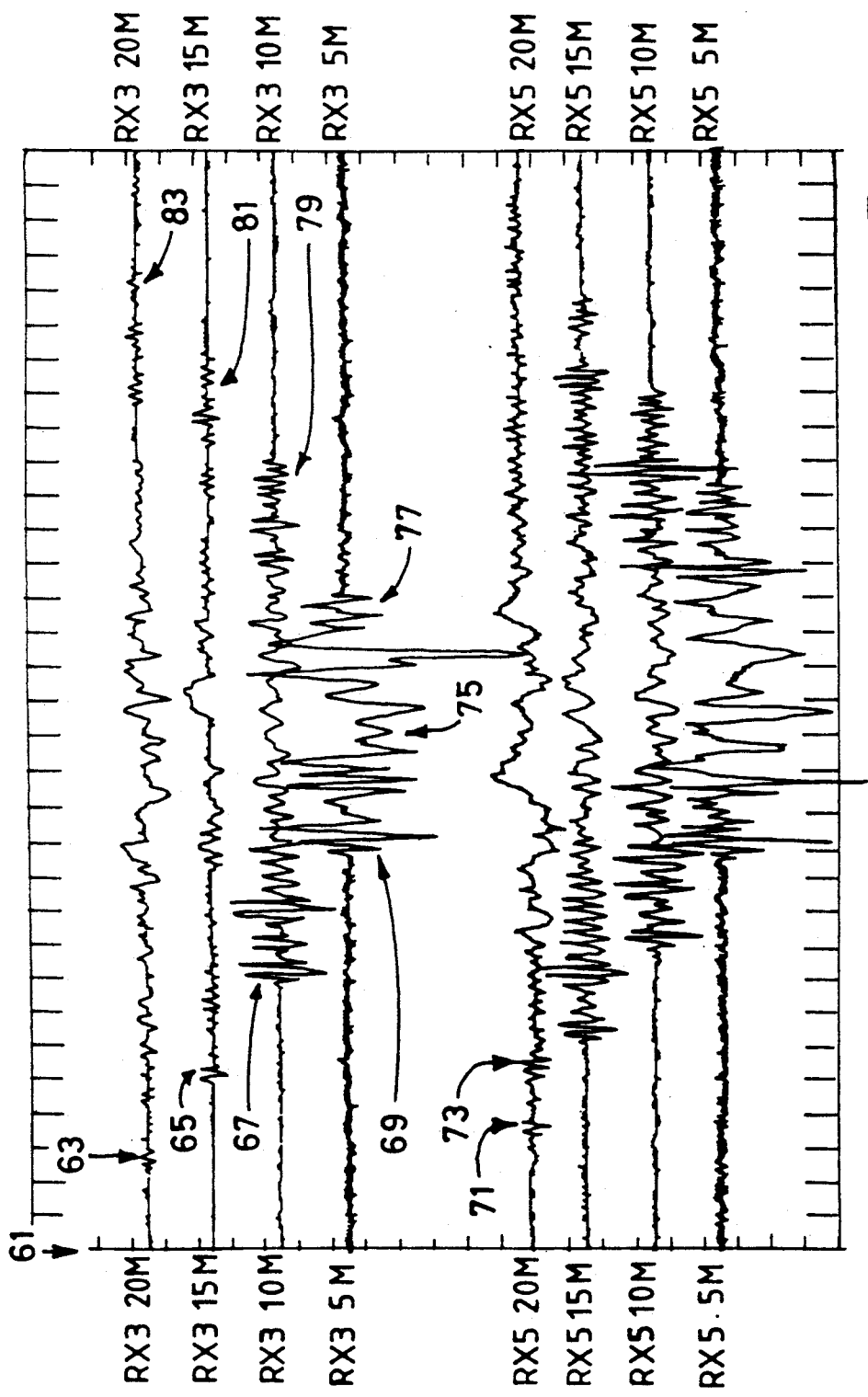

FIG. 12 shows the output from four range gates (5, 10, 15, 20 meters), for each of two receivers. There is a characteristic hyperbolic curve enclosing the missile approach and recede. The record illustrated shows considerable multipath echoes which the high resolution radar resolves from missile scatter. The left hand edge 61 of FIG. 12 corresponds to the instant before the misile arrives in the scoring zone. The missile is first detected at 63 at R×3 20 m and is then detected subsequently at shorter ranges 65, 67, 69. Separate reflections from nose and tail can be seen at 71 and 73. The middle part of the signal corresponds to multipath 75 and the missile then leaves each range gate in turn 77, 79, 81, 83.

Figure 13:
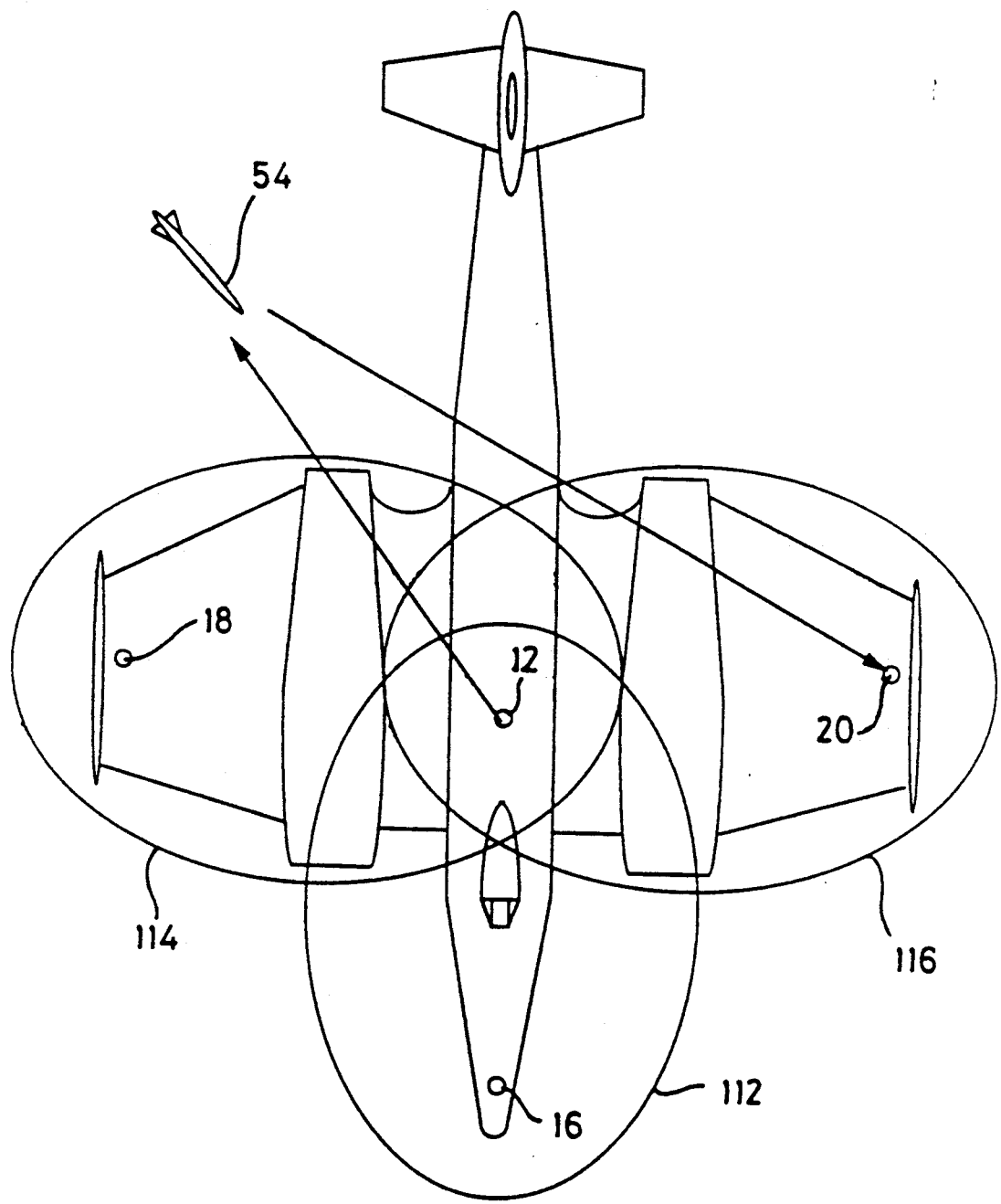

FIG. 13 shows a simplified system with a single transmitter 12 and three receivers 16, 18 20. Each receiver and the transmitter define respective notional envelopes or shells 112, 114, 116 of ellipsoidal shape, having the transmitter and receiver as foci. Each shell corresponds to a particular range gate at the corresponding receiver. No signal is observed at a range gate until the missile 54 penetrates the shell.

The range gates shown are augumented by range gates at other ranges and other receivers to give 32 range gate shells surrounding the aircraft which the missile will intersect in a sequence determined by its trajectory (see FIG. 15).

Figure 14:
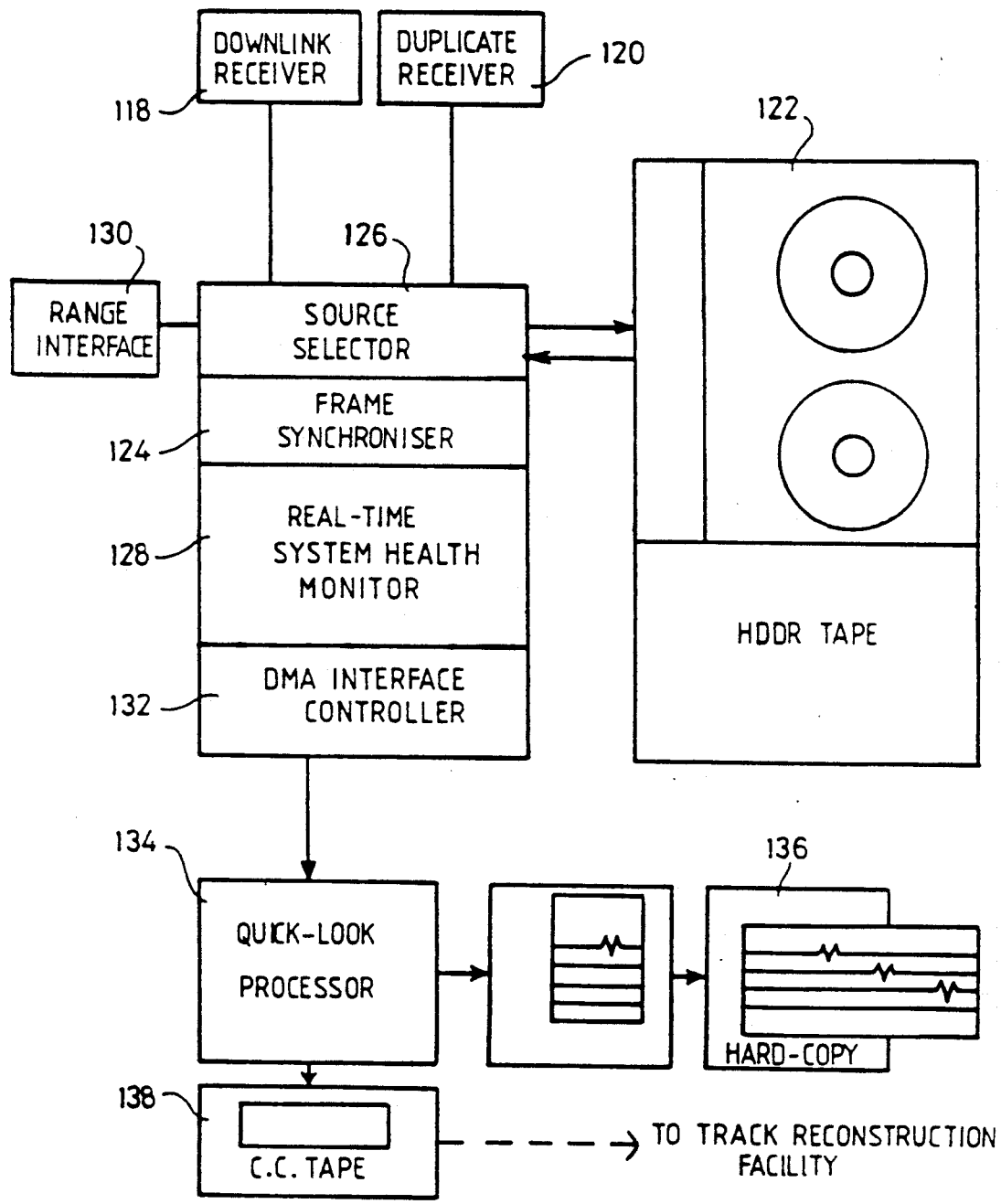

FIG. 14 shows the components of the telemetry receiver 36 and ground station 40.

The telemetry data is received at a downlink receiver 118 and its duplicate 120 and decrypted. (All the data from both receivers 118, 120 is recorded on HDDR tape 122 for later analysis). The data stream is analyzed by a frame synchronizer 124, which locates the frame synchronization word to divide the data into frames. One of the receiving channels is selected by a source selector 126 for monitoring by the real-time system health monitor 128 which gives a go/no go indication for the system. A range interface 130 multiplexes range data into the recording system such as time, firing event and voice communications.

For analysis, the data is replayed through a DMA interface controller 132 which dumps the data into the memory of a Quick Look Processor 134. The Quick Look Processor 134 prints the data out on a chart recorder 136 (a sequence of pictures as in FIG. 12 for each of the eight receivers) to enable a quick assessment of the trial.

The data is then transferred to computer compatible tape 138 for detailed analysis by the track reconstruction facility.

In FIG. 15 a missile track 140 is shown intersecting a family of envelopes corresponding to different range gates of the system. The important point is that the range gate intersections with respect to different receivers do not occur simultaneously. The missile trajectory is modelled as a straight line whose starting point and velocity are chosen to produce the observed range gate crossing times. Where separate features of the missile are detected (such as the nose and the tail), the different features move with a common velocity and the length between the points is constrained to a value around the physical length.

Thus the algorithm is minimized by the following function:

$$F = \sum_i [||x_i - p|| + ||x_i - R|| - d]^2$$

where:
$x_i$ Position of the detected missile feature at the time of detection
P Position of the transmitter which transmitted the pulse reflected from the missile
R Position of the receiver making the detection
d Range of the range gate making the detection

|| || Euclidean norm of the vector

The sum is taken over all detections of the missile.

Figure 16A:
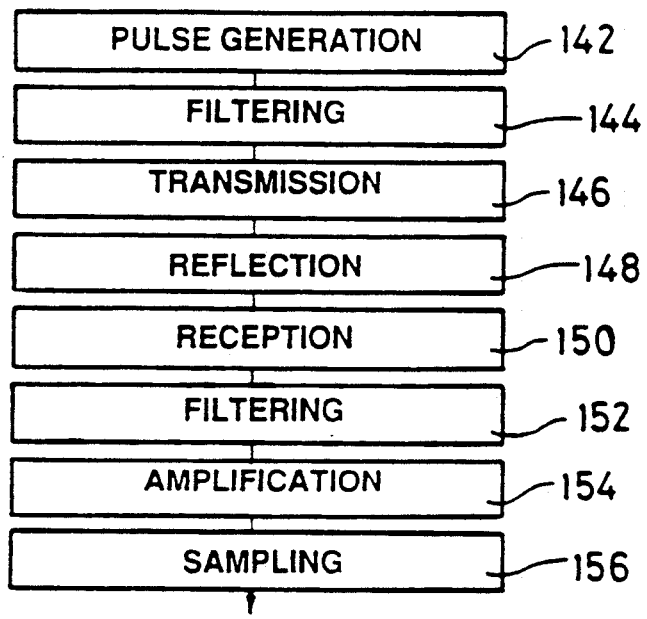

FIGS. 16a–16d show the sequence of the system in block form. Referring to FIG. 16a, pulse generation 142 corresponds to the generation (at 84 in FIG. 8) of the 2 nanosecond pulses at 2 MHz frequency. Filtering at 144 removes part of the frequency spectrum interfering with the aircraft systems and corresponds to filter 86 in FIG. 8. Transmission 146 is radiation of the sequence of pulses from the corresponding transmitter 12 or 14, and reflection 148 is reflection from the missile. Reception 150 is reception by the corresponding receiver, and filtering 152 rejects interfering sources (such as drone telecommand), corresponding to filters 88, 90, 92 in FIG. 8. Amplification 154 corresponds to the process in amplifier 94 in FIG. 8, and sampling 156 corresponds to the range gate sampling performed at 96, 98, 100, 102 in FIG. 8.

Figure 16B:
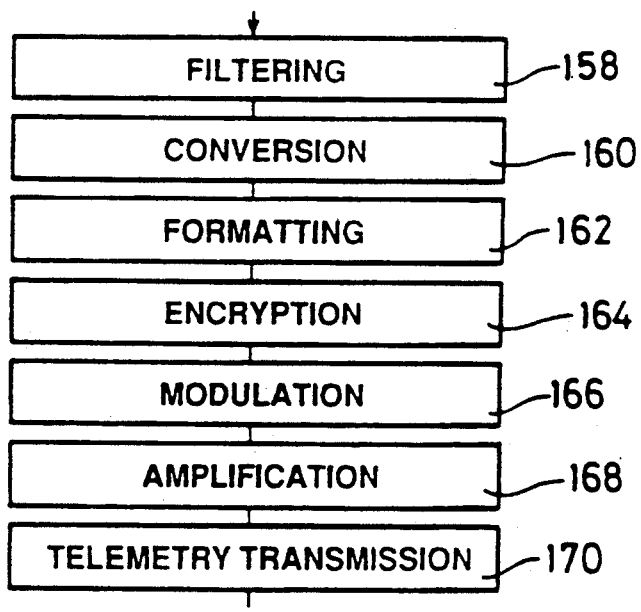

Referring to FIG. 16b, filtering 158 rejects out of band noise (corresponding to filters 104) and conversion 160 converts the signals from analog to digital format (corresponding to the analog to digital conversion in formatter 74). Formatting 162 involves gathering the data from the thirty two receive channels in a serial bit stream and encryption 164 prepares the data for transmission to the ground station. The signals are then modulated at 166 and amplified at 168 before being transmitted to the ground at 170, corresponding to function 34 in FIG. 1.

Figure 16C:
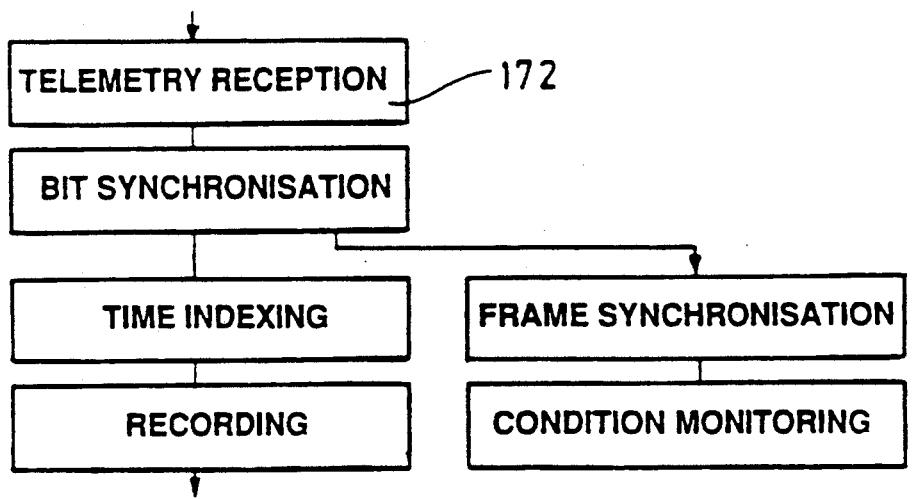
Figure 16D:
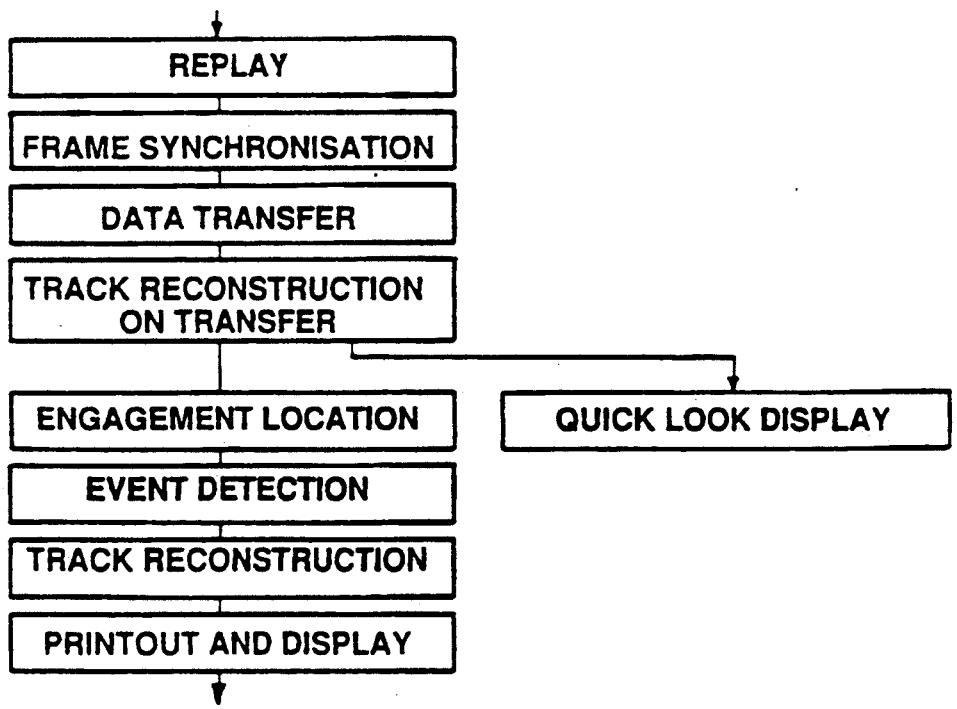

Referring to FIG. 16c, the data is received on the ground (172) by the telemetry receiver 36 of FIG. 1. The remaining functions are carried out on the ground and are as indicated in the legends in the blocks of FIGS. 16c and 16d.

The described system also measures the pitch and yaw of the missile, which it derives from the tracks of two independent scatterers on the missile (such as the nose and tail).

The described system may be extended to measure curved trajectories by adding more range gates to the system.

We claim:

1. A system for sensing the approach of a moving missile to a target, comprising transmitting means on the target for transmitting a succession of transmit pulses, receiving means on the target for receiving the pulses reflected by the missile, gating means on the target for sampling the reflected pulses received at the receiving means during a succession of time windows each of which is delayed with respect to the time of transmission of a corresponding transmit pulse by a predetermined time delay corresponding to the pulse travelling a predetermined distance from the transmitting means to the missile and thence back to the receiving means, so that sampled signals from the receiving means are indicative of the missile entering or leaving a notional envelope surrounding the target at a range corresponding to said predetermined time delay, processing means which are responsive to the sampled signals and which compute the approach of the missile, and pulse generating means included in the transmission means, for generating said transmit pulses, each of which commences, from a level of no significant transmitted power in the frequency bandwidth of the pulse, with a rapid rise to a power peak and a rapid fall such that each transmit pulse consists substantially of a single radio frequency cycle and such that the sampled signals indicate reflected pulses from the missile.

2. A system according to claim 1, wherein said pulse generating means comprises means for producing transmit pulses each having a time duration less than 4 nanoseconds.

3. A system according to claim 1, wherein the gating means comprises means for producing gating pulses each having a duration corresponding to said time window.

4. A system according to claim 3, wherein the gating means comprises means for producing gating pulses each having a duration of substantially 700 picoseconds.

5. A system according to claim 3, wherein the gating means comprises means operative to sample the reflected pulses at the receiving means at a plurality of different time delays, so that the sampled signals from the receiving means are indicative of the missile entering or leaving a plurality of notional envelopes having sizes corresponding to the respective time delays.

6. A system according claim 1, wherein the transmitting means comprise a single transmitter and the receiving means comprise a single receiver.

7. A system according to claim 6, wherein the single transmitter and single receiver are located at the same position, or closely adjacent one another, so that the or each envelope is a sphere, or closely approximates to a sphere, centered on the transmitter and receiver.

8. A system according to claim 1, wherein the receiving means include a plurality of receivers located at different positions on the target, each receiver being associated with the same transmitter and each giving rise to a corresponding notional envelope for each time delay.

9. A system according to claim 1, wherein the transmitting means comprise two transmitters located at different positions on the target, the transmit pulses from the two transmitters being interleaved, so that pulses are produced from the transmitters in alternate sequence.

* * * * *